US007533662B2

(12) United States Patent
Kiyomura et al.

(10) Patent No.: US 7,533,662 B2
(45) Date of Patent: May 19, 2009

(54) APPARATUS FOR AND METHOD OF CONTROLLING AIR-FUEL RATIO OF ENGINE

(75) Inventors: Akira Kiyomura, Isesaki (JP); Hisanori Ozaki, Tokyo (JP)

(73) Assignees: Hitachi, Ltd., Tokyo (JP); Fuji Heavy Industries Ltd., Tokyo (JP)

( * ) Notice: Subject to any disclaimer, the term of this patent is extended or adjusted under 35 U.S.C. 154(b) by 239 days.

(21) Appl. No.: 11/723,594

(22) Filed: Mar. 21, 2007

(65) Prior Publication Data

US 2007/0221183 A1 Sep. 27, 2007

(30) Foreign Application Priority Data

Mar. 22, 2006 (JP) ............................ 2006-078020

(51) Int. Cl.
*F02D 41/00* (2006.01)
*B60T 7/12* (2006.01)

(52) U.S. Cl. ........................ 123/672; 123/679; 701/108

(58) Field of Classification Search ................ 123/672, 123/673, 676, 679, 690, 691, 692; 701/103, 701/104, 108; 60/276, 285, 302
See application file for complete search history.

(56) References Cited

U.S. PATENT DOCUMENTS

| | | | | |
|---|---|---|---|---|
| 6,961,653 | B2 * | 11/2005 | Maki | 701/109 |
| 7,337,772 | B2 * | 3/2008 | Yasui et al. | 123/697 |
| 2002/0038177 | A1 * | 3/2002 | Ishikawa et al. | 701/103 |
| 2002/0198649 | A1 * | 12/2002 | Stotsky et al. | 701/113 |
| 2005/0005690 | A1 * | 1/2005 | Maki | 73/118.1 |

FOREIGN PATENT DOCUMENTS

| | | |
|---|---|---|
| JP | 5-141294 | 6/1993 |

* cited by examiner

*Primary Examiner*—John T Kwon
(74) *Attorney, Agent, or Firm*—Foley & Lardner LLP

(57) ABSTRACT

A technique of controlling an air-fuel ration for an engine, in which an air-fuel ratio feedback correction coefficient α to correct an amount of fuel injection into the engine is computed based on an output from an air-fuel ratio sensor disposed on an upstream side of a catalytic converter. A gain of the air-fuel ratio feedback correction coefficient α in respect to a detection result of the air-fuel ratio sensor is decreased as a delay in a transient response of the air-fuel ratio sensor occurs. Thus, an excessive increase in the amount of fuel injection immediately after fuel cuts is prevented.

25 Claims, 12 Drawing Sheets

APPARATUS FOR AND METHOD OF CONTROLLING AIR-FUEL RATIO OF ENGINE

BACKGROUND OF THE INVENTION

1. Field of the Invention

The present invention relates generally to an apparatus for and method of controlling an air-fuel ratio of an engine according to an output from an exhaust gas sensor.

2. Description of the Related Art

Japanese Unexamined Patent Publication No. 1993(H05)-141294 discloses that when supply of a fuel is resumed after a fuel cut-off, alteration of an air-fuel-ratio-feedback-correction coefficient is inhibited for a predetermined period of time after the resumption of the fuel supply.

Inhibition of alteration of the air-fuel-ratio-feedback-correction coefficient as described above will generate a delay in the response of an air-fuel ratio sensor, which in turn causes an excessive increase in the amount of fuel injection, and as a result, it will be possible to prevent the air-fuel ratio from becoming excessively rich.

However, if a transient response of the air-fuel ratio sensor slows down due to deterioration in the performance of the sensor, the alteration of the air-fuel-ratio-feedback-correction coefficient might be started during a delay in detection by the air-fuel ratio sensor. As a result, the fuel injection amount is excessively increased and accordingly, the air-fuel ratio will become excessively rich, leading to degradation in performance of emission control as well as drivability.

SUMMARY OF THE INVENTION

An object of the invention is, therefore, to prevent excessive fuel injection even in the case where a transient response of an air-fuel ratio sensor slows down.

In accordance with the present invention, in order to achieve the foregoing object, an output characteristic of a control signal for an air-fuel ratio, which is based on a signal delivered, as an output, by a first exhaust gas sensor provided on upstream side of a catalytic converter which is disposed in an exhaust pipe attached to the engine, is corrected according to a transient response of the first exhaust gas sensor.

The other objects, features, and advantages of this invention will become more apparent from the following description with reference to the accompanying drawings.

DESCRIPTION OF THE PREFERRED EMBODIMENTS

Figure 1:
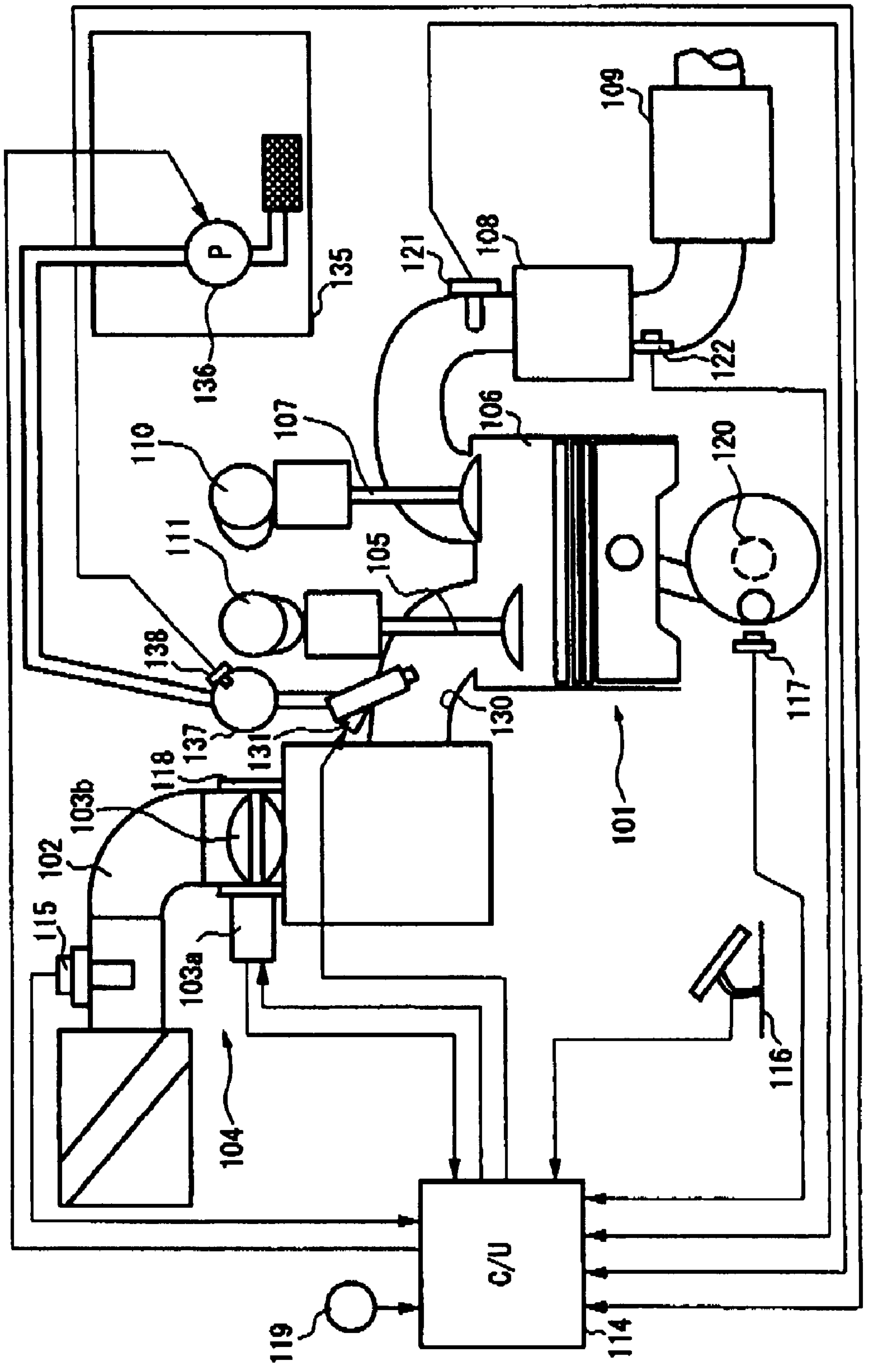
FIG. 1 is a system diagram showing a general configuration of a vehicular engine to which the present invention is applied.

Referring now to FIG. 1, there is shown a general structure of a system for a vehicle engine to which the present invention is applied.

As shown in FIG. 1, interposed between an engine (internal combustion engine) 101 and an intake pipe 102 is an electronic control throttle 104 that opens or closes a throttle valve **103*b* by a throttle motor 103*a***.

Via electronic control throttle 104 and an intake valve 105, air is taken into a combustion chamber 106.

An electromagnetic type fuel injection valve 131 is provided for an intake port 130 defined in each cylinder, When opened in response to an injection pulse signal from a control unit 114, fuel injection valve 131 injects fuel adjusted to a predetermined pressure towards intake valve 105.

The gaseous mixture formed in combustion chamber 106 is ignited by an ignition plug (not shown) and burned.

Exhaust gas produced as a result of burning the gaseous mixture in combustion chamber 106 is ejected to an exhaust pipe via an exhaust valve 107 and purified by a first catalytic converter 108 and a second catalytic converter 109 arranged on the downstream side of first catalytic converter 108, and then exhausted toward the atmosphere.

First catalytic converter 108 is, for instance, a three-way catalytic converter, and second catalytic converter 109 is, for instance, a reduction catalytic converter having the function of adsorbing NOx.

Intake valve 105 is driven by a cam mounted on an intake camshaft 111, and exhaust valve 107 is driven by a cam mounted on an exhaust camshaft 110.

A fuel tank 135 incorporates an electric fuel pump 136, which is driven to pump fuel towards fuel injection valve 131.

A distributing pipe 137, by which the fuel discharged from fuel pump 136 is distributed to each of fuel injection valves 131, is provided with a fuel pressure sensor 138 that detects a fuel pressure prevailing in distributing pipe 137.

Control unit 114 controls the amount of fuel discharge from fuel pump 136 so as to provide such a feedback control that the fuel pressure detected by fuel pressure sensor 138 becomes a target pressure.

Control unit 114 incorporates therein a microcomputer, operates to process detection signals from various sensors according to a program stored in advance, and delivers outputs of various control signals to electronic control throttle 104, fuel injection valve 131, fuel pump 136, etc.

Besides above-mentioned fuel pressure sensor 138, the various sensors include: an acceleration opening degree sensor 116 that measures the degree of depression of an accelerator pedal operated by a driver; an air flow meter 115 that measures a quantity Q of air taken into engine 110; a crank angle sensor 117 that delivers an output signal indicative of the position of a crank shaft 120 during the rotation thereof, by detecting a predetermined detection part disposed on a signal plate held by crank shaft 120; a throttle sensor 118 that detects an opening degree to which throttle valve **103*b* is open (TVO); a water temperature sensor 119 that detects a temperature of cooling water of engine 101; an air-fuel ratio sensor 121 (a first exhaust gas sensor) that detects air-fuel ratios over a wide range based upon the oxygen concentration in the exhaust gas on the upstream side of first catalytic converter 108; and an oxygen sensor 122 (a second exhaust gas sensor) that detects whether an air-fuel ratio is rich or lean relative to a theoretical air-fuel ratio, based upon the oxygen concentration in exhaust downstream of first catalytic converter 108**.

The structure of air-fuel ratio sensor 121 and the principle of detecting an air-fuel ratio will now be described in detail.

It should, however, be understood that the structure of air-fuel ratio sensor 121 and the detection principle are not limited to the descriptions given below.

Figure 2:
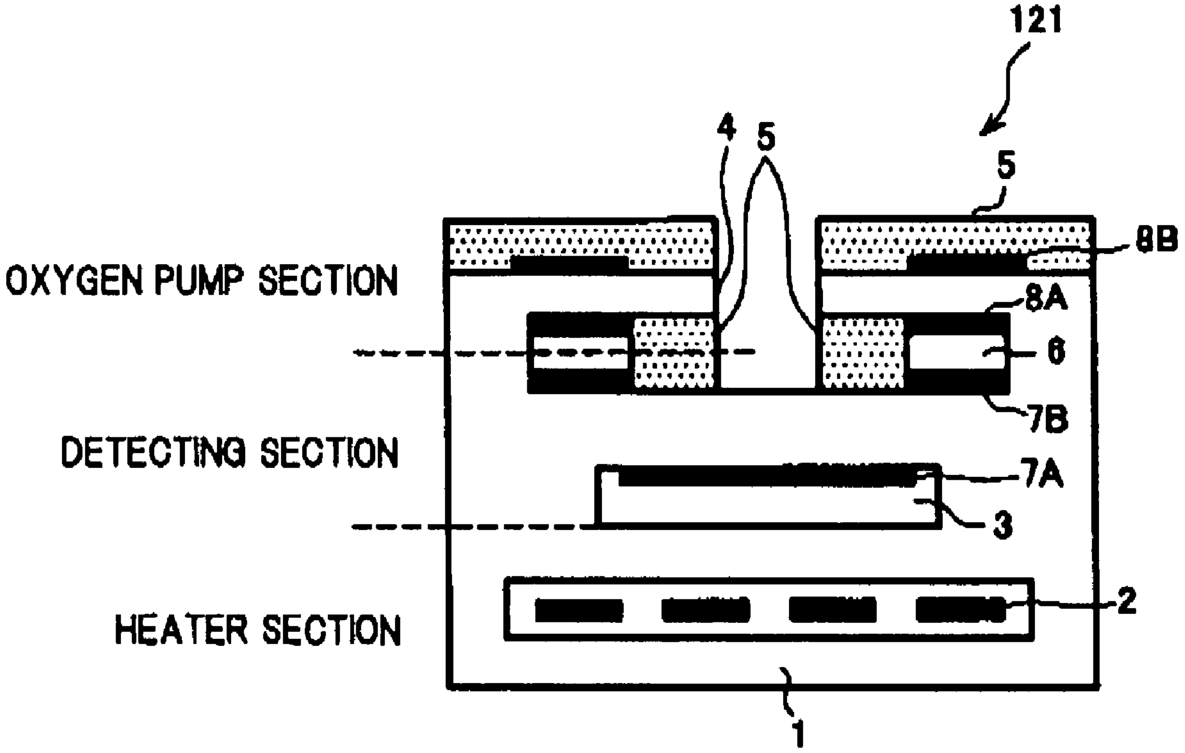
FIG. 2 is a schematic view showing the internal structure of an air-fuel ratio sensor mounted on the engine.

FIG. 2 shows the structure of air-fuel ratio sensor 121. A main body 1 of air-fuel ratio sensor 121 is made of a heat-resistant porous insulating material, such as zirconia, which is conductive of oxygen ions. A heater 2 is disposed in main body 1.

Main body 1 has an atmosphere inlet 3 communicating with an air, and a gas diffusion layer 6 communicating with the exhaust pipe of engine via a gas inlet 4 and a protective layer 5.

Electrodes 7A and 7B are disposed facing atmosphere inlet 3 and gas diffusion layer 6, respectively. An electrode 8A is disposed along gas diffusion layer 6, and an electrode 8B is disposed along main body 1 so as to correspond with gas diffusion layer 6.

A voltage corresponding to the ratio of the oxygen ion concentration (oxygen partial pressure) in gas diffusion layer 6 to the oxygen ion concentration in the air is generated between electrodes 7A and 7B. Based on this voltage, whether an air-fuel ratio is rich or lean relative to the theoretical air-fuel ratio, i.e., the stoichiometric air-fuel ratio is determined.

On the other hand, a voltage is applied between electrodes 8A and 8B according to the voltage generated between electrodes 7A and 7*b*, that is, according to the result of the determination whether the air-fuel ratio is rich or lean.

When the voltage of a predetermined level is applied between electrodes 8A and 8B, oxygen ions in gas diffusion layer 6 are consequently moved, and a current flows between electrodes 8A and 8B.

In this case, since a current value Ip between electrodes 8A and 8B is affected by the concentration of oxygen ions in the exhaust, the air-fuel ratio can be determined through determination of the current value Ip.

Figure 3:
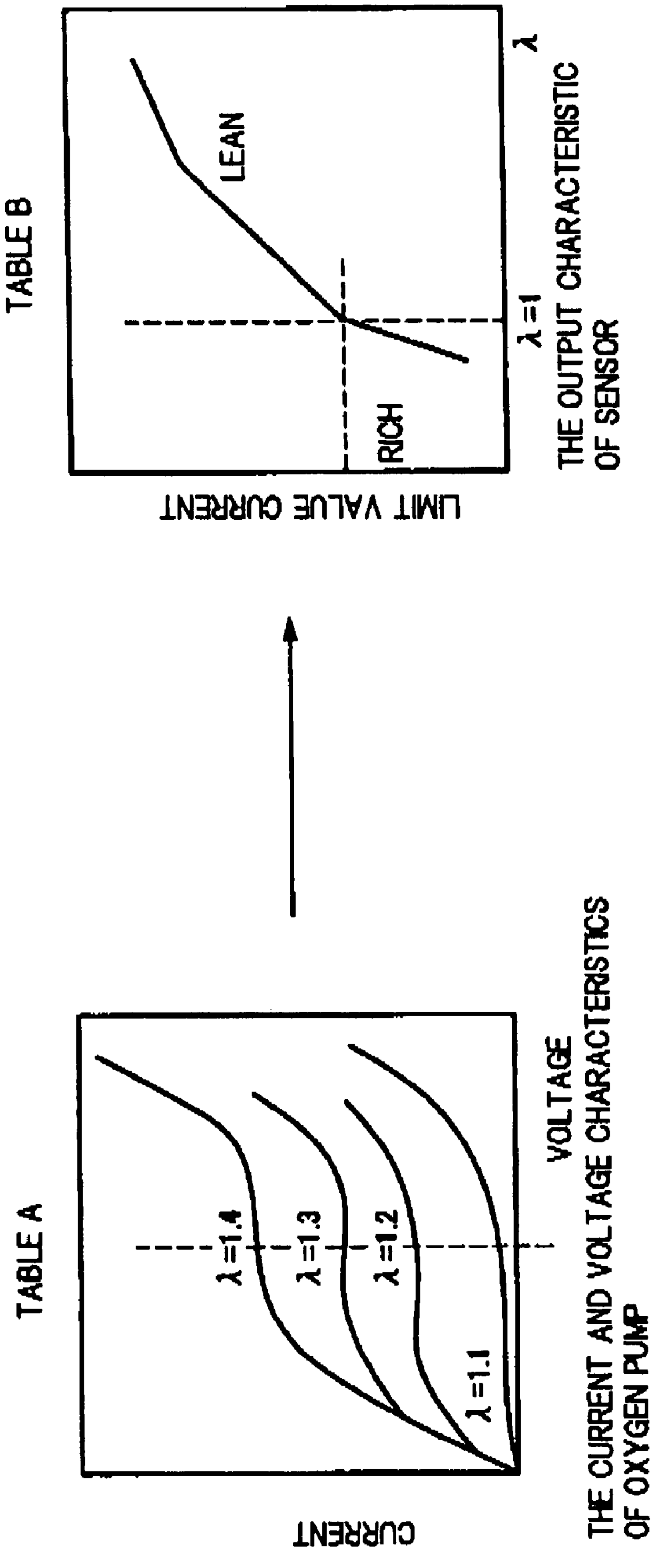
FIG. 3 is a diagrammatic view explaining the detection principle of the air-fuel ratio sensor.

That is to say, as shown in table (A) in FIG. 3, there is a correlation between electrodes 8A and 8B in terms of air-fuel ratio and current and voltage. Based upon a rich-state or lean-state output from electrodes 7A and 7B, the direction of the voltage applied between electrodes 8A and 8*b* is reversed. Thereby, both a lean air-fuel ratio and a rich air-fuel ratio can be detected based on the current value Ip flowing between electrodes 8A and 8*b*.

Based on the principle described above, an air-fuel ratio can be detected over a wide range by converting the current value Ip between electrodes 8A and 8B to air-fuel ratio data according to table (B) shown in FIG. 3.

On the other hand, in oxygen sensor 122, electrodes are disposed on the internal face and external face of a tubular substrate made of, for example, zirconia. Oxygen sensor 122 is designed such that, while the outside of the tubular substrate is exposed to exhaust gas, the atmospheric air is introduced in the inside of the tubular substrate and electromotive force is generated between electrodes 8A and 8B by the difference between the oxygen partial pressure of the atmospheric air and that of the exhaust gas.

In place of oxygen sensor 122, an air-fuel ratio sensor (serving as second exhaust gas sensor) that is identical in structure to air-fuel ratio sensor 121 may be disposed downstream of first catalytic converter 108.

Similarly, in place of air-fuel ratio sensor 121, an oxygen sensor (serving as first exhaust gas sensor) that is identical in structure to oxygen sensor 122 may be disposed upstream of first catalytic converter 108.

Control unit 114 incorporates a microcomputer that includes a CPU, ROM, RAM, A/D converter, input-output interface, etc. Control unit 114 controls injection of fuel by fuel injection valve 131 as described below.

Based on the flow rate Qa of intake air, which is measured by air flow meter 115, and the engine rotating speed Ne, which is found from the rotated position signal output from crank angle sensor 117, control unit 114 calculates a basic fuel injection pulse width Tp corresponding to the target air-fuel ratio, following the equation described below.

$$Tp = K \times Qa/Ne \text{ ($K$ is a constant)}$$

Additionally, control unit 114 calculates: a correction coefficient Kw for correcting an amount of fuel injection so as to increase fuel when the temperature is low; a correction coefficient Kas for correcting an amount of fuel injection so as to increase fuel when and after engine 101 is started; an air-fuel ratio feedback correction coefficient α for making an actual air-fuel ratio closer to the target air-fuel ratio; and a compensation Ts for compensating for delay in opening fuel injection valve 131, which may be caused by the power source voltage.

Control unit 114 then calculates the final fuel injection pulse width Ti, according to the equation described below.

$$Ti = Tp \times (1 + Kw + Kas + \ldots) \times \alpha + Ts$$

After calculating the final fuel injection pulse width Ti, control unit 114 delivers an output of an injection pulse signal indicative of the fuel injection pulse width Ti to fuel injection valve 131, thereby causing fuel injection valve 131 to inject a quantity of fuel, which is proportional to an effective injection pulse width Te obtained by subtracting the compensation Ts from the fuel injection pulse width Ti.

The air-fuel ratio feedback correction coefficient α is set by proportional action, integral action, and derivative action based on the difference between an actual air-fuel ratio measured by air-fuel ratio sensor 121 and the target air-fuel ratio.

The calculation of the air-fuel ratio feedback correction coefficient α based on the output of air-fuel ratio sensor 121 will be hereinafter referred to as first air-fuel ratio feedback control.

In addition, based upon the determination made by oxygen sensor 122 whether the air-fuel ratio is rich or lean, second air-fuel ratio feedback control is also executed.

The second air-fuel ratio feedback control includes control executed such that the degree of skipping operation for the air-fuel ratio feedback correction coefficient α, an integral gain, a delay in operation timing based on the degree of skipping operation, a target air-fuel ratio compared to the detection result of air-fuel ratio sensor 121, etc. can be altered based on the detection result of oxygen sensor 122 (refer to Japanese Unexamined Patent Publication H 01(1989)-257738).

Thus, in the present embodiment, the air-fuel ratio feedback correction coefficient α, serving as an air-fuel ratio control signal, is calculated based on the output of air-fuel ratio sensor 121 and the output of oxygen sensor 122.

Further, when engine 101 is decelerated, control unit 114 cuts the fuel in order to stop fuel injection by fuel injection valve 131.

Control unit 114 starts to cut fuel when engine 101 is decelerated such that the accelerator pedal is in the idling position and the engine rotating speed Ne exceeds a predetermined rotating speed Ne1. Control unit 114 resumes fuel injection by fuel injection valve 131 when the accelerator pedal is depressed or the engine rotating speed Ne falls below a predetermined rotating speed Ne 2 (<Ne 1).

In this case, during the described fuel cut, an air-fuel ratio feedback correction coefficient α is set (clamped) to bring engine into an open control state. When a pre-stored delay time has elapsed after fuel injection is resumed, the air-fuel ratio feedback control is resumed.

When the fuel injection is resumed after a fuel cut, the air-fuel ratio changes from an extremely lean state to a state close to the target air-fuel ratio. In this case, the output of air-fuel ratio sensor 121 changes later than the air-fuel ratio.

Accordingly, resumption of the air-fuel ratio feedback control is delayed for a time after resumption of fuel injection, In order to prevent the air-fuel ratio feed back control from being resumed during a transition response of air-fuel sensor 121 with the result that fuel may be excessively injected.

However, if the delay in the response of air-fuel ratio sensor 121 is very long due to its deterioration, sensor 121 may detect an air-fuel ratio that is significantly lean in comparison with the actual air-fuel ratio, despite the air-fuel ratio feedback control having been resumed after the delay. As a result, a correction is made to excessively increase the amount of fuel injection.

Figure 4:
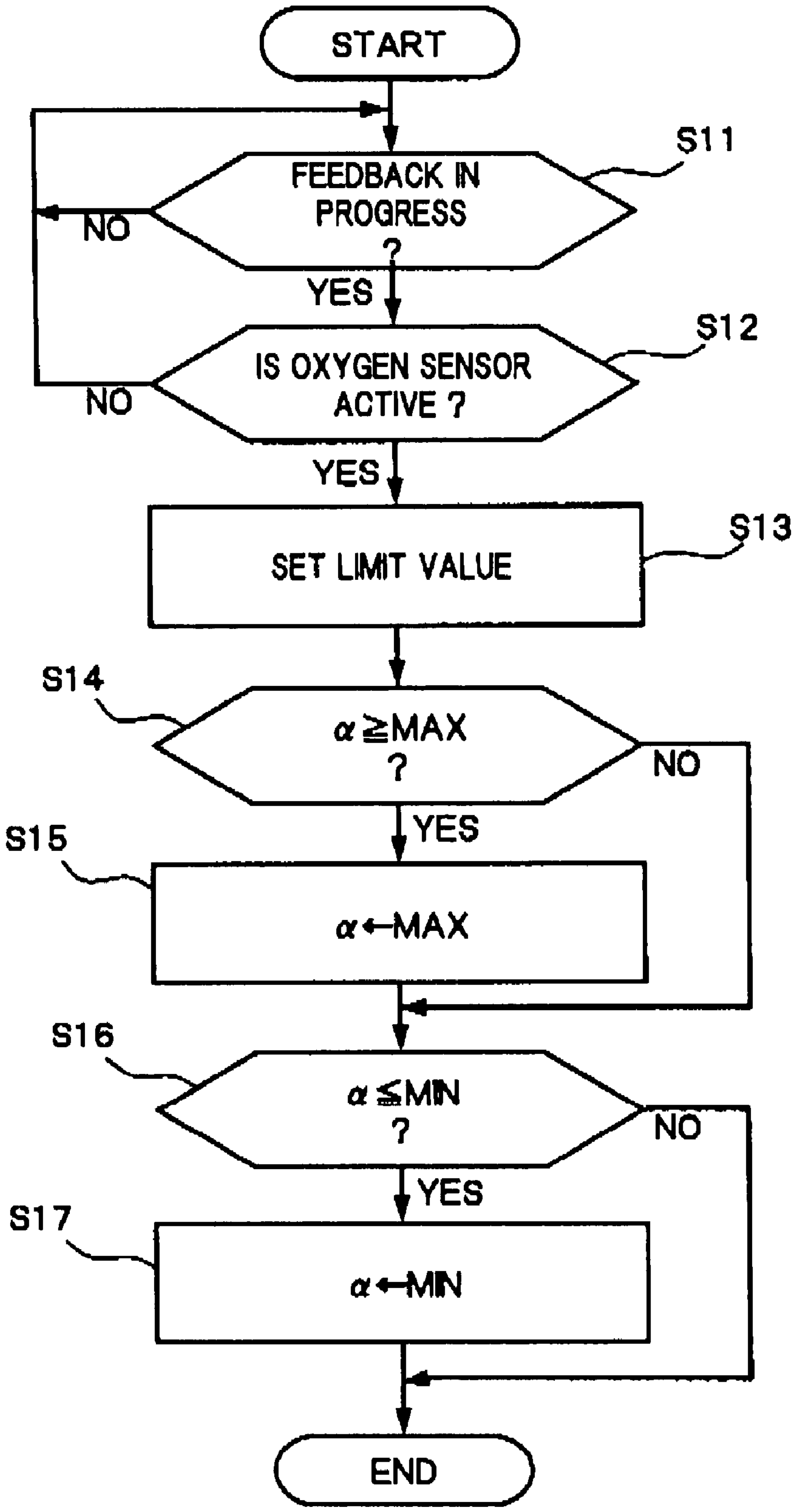
FIG. 4 is a flowchart showing a first embodiment of air-fuel ratio control according to the present invention.

To prevent such a situation, the present embodiment proceeds as shown in the flowchart in FIG. 4, whereby excessive amount of fuel injection is prevented even if a transition response degrades due to deterioration of air-fuel ratio sensor 121.

In the flowchart in FIG. 4, the control unit first determines in step S11 whether air-fuel ratio feedback control corresponding to the output of air-fuel ratio sensor 121 is being executed or not.

If the determination is affirmative, the flow proceeds to step S12.

In step S12, it is determined whether oxygen sensor 122 disposed downstream of first catalytic converter 108 is in an active state or not.

The determination whether oxygen sensor 122 is in the active state can be made based on, for example, the temperature of the cooling water of engine 101, the temperature of first catalytic converter 108, or the output of oxygen sensor 122.

If oxygen sensor 122 is in the active state, the flow proceeds to step S13.

In step S13, an upper limit value MAX and a lower limit value MIN for the air-fuel ratio feedback correction coefficient α are set according to the output of oxygen sensor 122.

Figure 5:
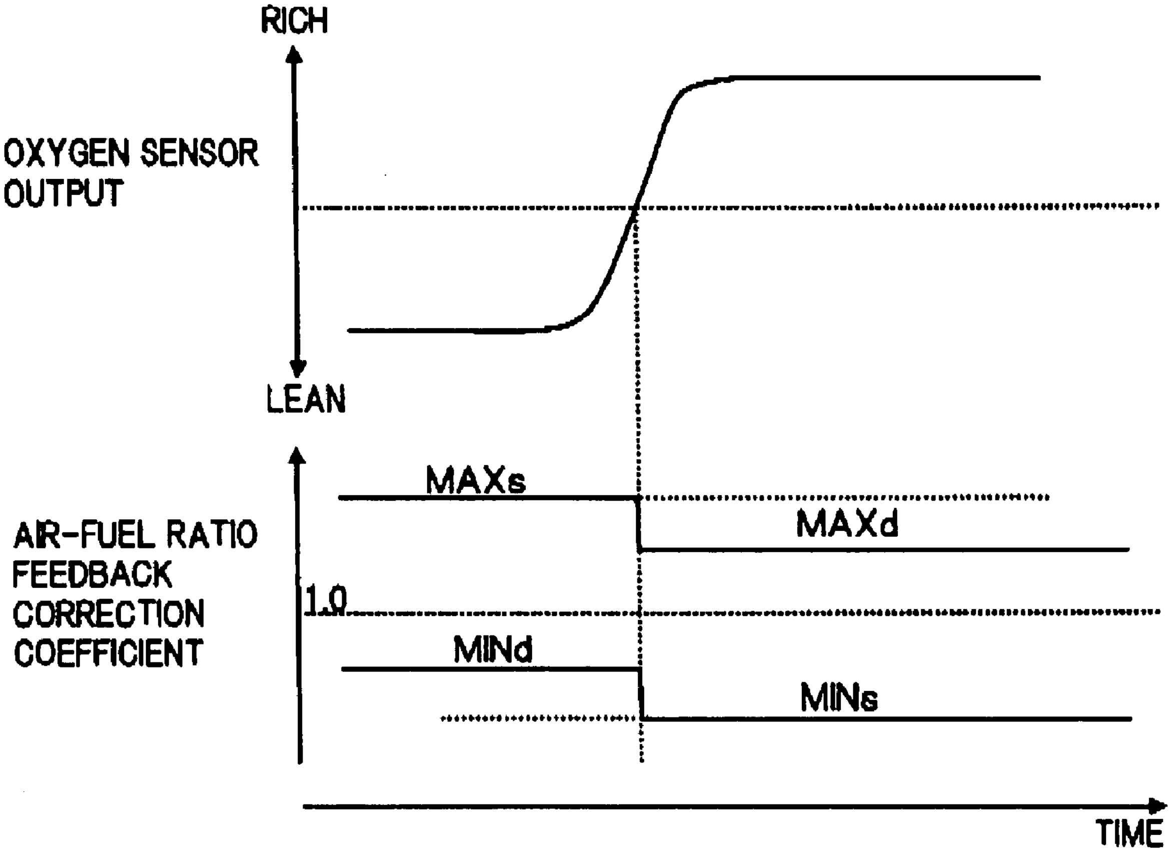
FIG. 5 is a time chart showing characteristics of a limit value in the first embodiment.

Specifically, if the output of oxygen sensor 122 indicates that the air-fuel ratio is rich, the upper limit value MAX is switched to another upper limit value MAXd that is lower than default MAXs. If the output of oxygen sensor 122 indicates that the air-fuel ratio is lean, the lower limit value MIN is switched to another lower limit value MINd that is higher than default MINs (refer to FIG. 5).

Figure 6:
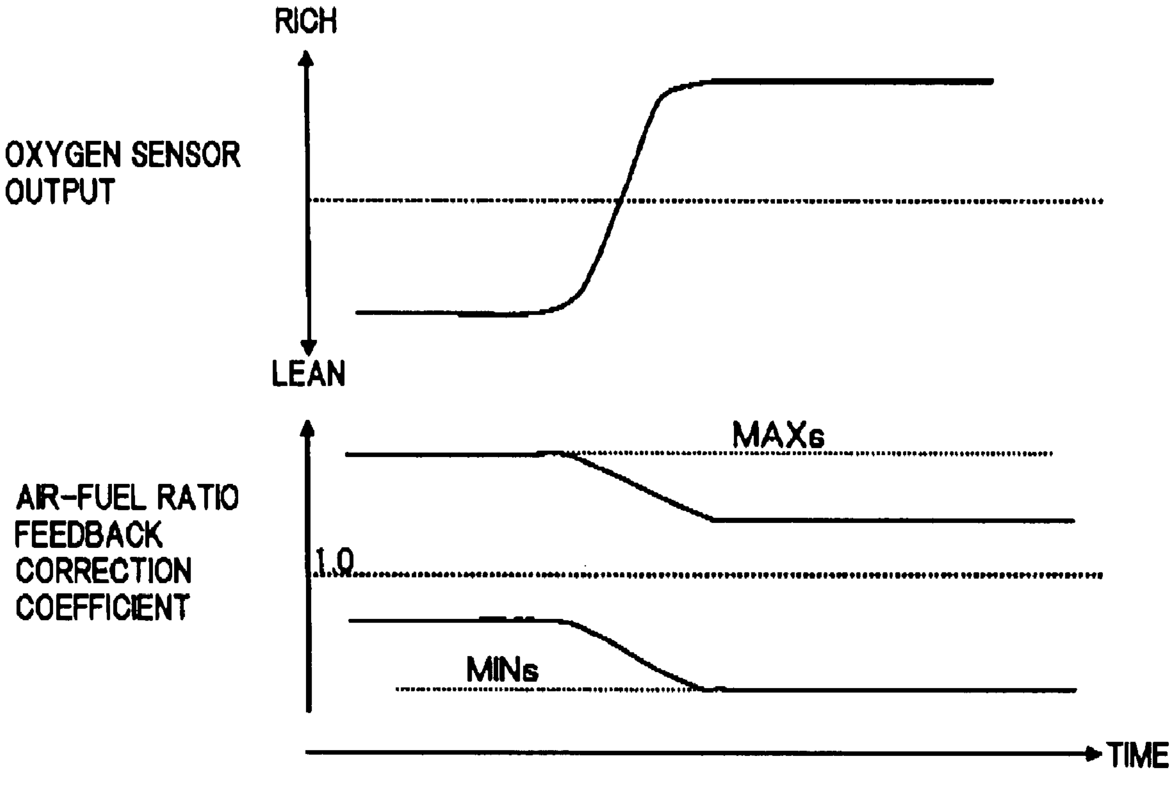
FIG. 6 is a time chart showing different characteristics of the limit value used in the first embodiment.

In addition, in a different characteristic, as the output of oxygen sensor 122 becomes richer, the upper limit value MAX may be made lower than the default MAXs, and as the output of oxygen sensor 122 becomes lean, the lower limit value MIN may be made higher than the default MINs (refer to FIG. 6).

In step S14, control unit 14 determines whether or not the air-fuel ratio feedback correction coefficient α computed latest is equal to the upper limit value MAX or above.

If the air-fuel ratio feedback correction coefficient α is below the upper limit value MAX, the flow skips step S15 and proceeds to step S16. If the air-fuel ratio feedback correction coefficient α is equal to the upper limit value MAX or above, the flow proceeds to step S15.

Figure 7:
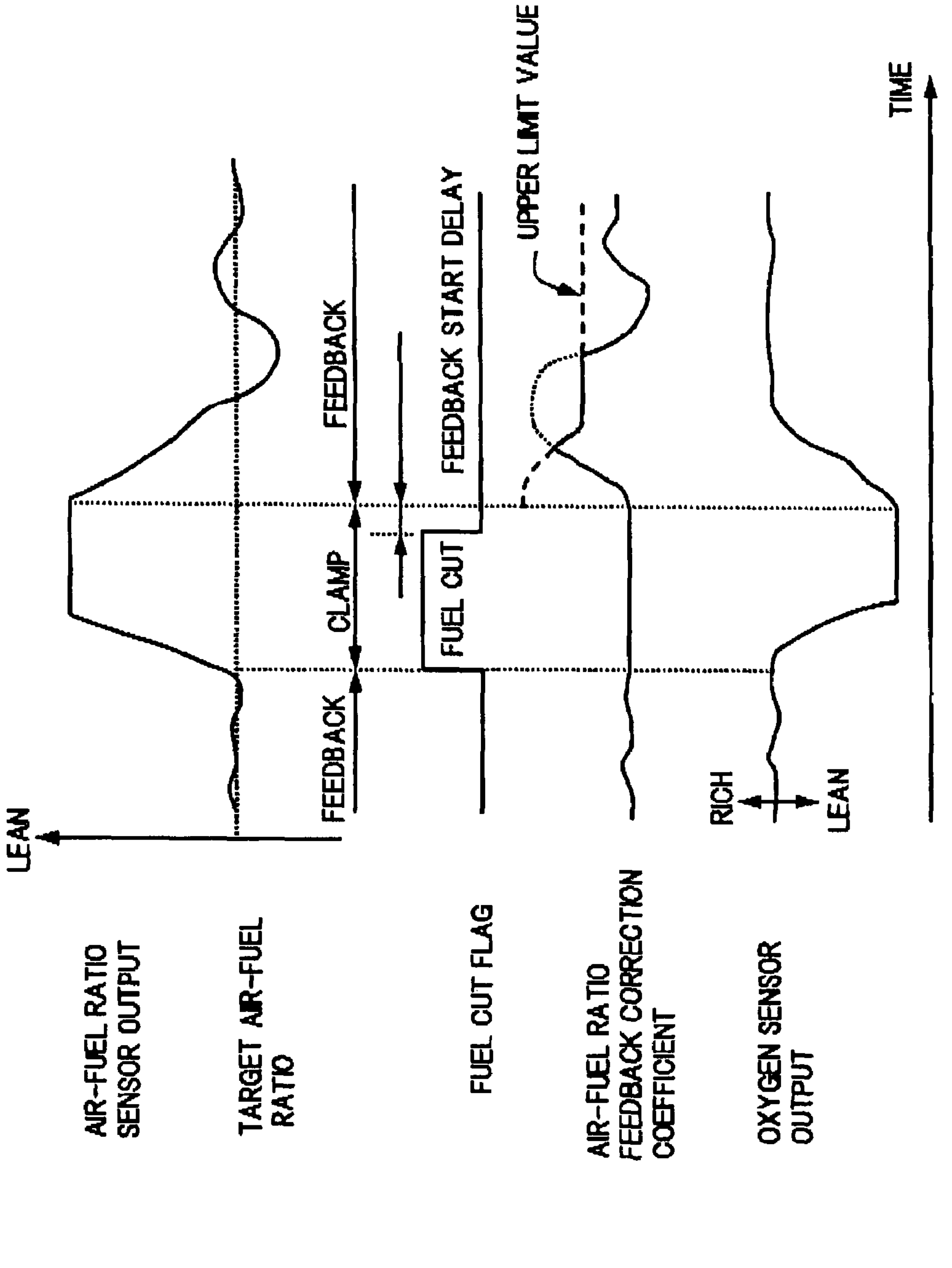
FIG. 7 is a time chart showing the control characteristics of the air-fuel ratio in the first embodiment.

In step S15, the air-fuel ratio feedback correction coefficient α is set to the upper limit value MAX so as not to exceed the upper limit value MAX (refer to FIG. 7).

In step S16, control unit 14 determines whether or not the air-fuel ratio feedback correction coefficient α computed latest is equal to the lower limit value MIN or below.

If the air-fuel ratio feedback correction coefficient α exceeds the lower limit value MIN, the flow skips step S17 and ends the present routine. If the air-fuel ratio feedback correction coefficient α is equal to the lower limit value MIN or below, the flow proceeds to step S17.

In step S17, the air-fuel ratio feedback correction coefficient α is set to the lower limit value MIN, to prevent the air-fuel ratio feedback correction coefficient α from falling below the lower limit value MIN.

Setting the upper limit value MAX and lower limit value MIN in accordance with the output of oxygen sensor 122 and limiting the air-fuel ratio feedback correction coefficient α by the upper limit value MAX and limit value MIN, as described above, prevents the air-fuel ratio feedback correction coefficient α from increasing or decreasing excessively due to a delay in the transient response of air-fuel ratio sensor 121.

For instance, when fuel injection is resumed after a fuel cut, the concentration of oxygen present downstream of first catalytic converter 108 decreases more slowly than the concentration of oxygen appearing on the upstream side of first catalytic converter 108.

Therefore, by the time when oxygen sensor 122 determines that the air-fuel ratio is rich, the air-fuel ratio of the concentration of the oxygen appearing on the upstream side of first catalytic converter 108 should be rich and the air-fuel ratio feedback correction coefficient α should have decreased.

Specifically, when oxygen sensor 122 determines after the fuel cut that the air-fuel ratio is rich, the actual air-fuel ratio is dose to or richer than the target ratio and the air-fuel ratio feedback correction coefficient α to acquire the target air-fuel ratio should have been changed to a smaller value. If the air-fuel ratio feedback correction coefficient α remains large, it is assumed that the air-fuel ratio feedback correction coefficient α is excessively large due to a significantly long delay in the transient response of air-fuel ratio sensor 121.

In other words, even if the upper limit value MAX of the air-fuel ratio feedback correction coefficient α is decreased when oxygen sensor 122 determines that the air-fuel ratio is rich, any limitation to the required correction is not made so long air-fuel ratio sensor 121 exhibits a normal transient response. Thus, if the set air-fuel ratio feedback correction coefficient α exceeds the upper limit value MAX that has been decreased, it is assumed that the air-fuel ratio feedback correction coefficient α has become excessively large due to a delay in the transient response of air-fuel ratio sensor 121.

To counteract such a situation, the air-fuel ratio feedback correction coefficient α is limited by decreasing the upper limit value MAX when oxygen sensor 122 detects a rich air-fuel ratio. This prevents an excessive increase of the air-fuel ratio feedback correction coefficient α, which would result from a delay in the transient response of air-fuel ratio sensor 121. Accordingly, degradation in exhaust performance and drivability can be prevented (refer to FIG. 7).

In addition, preventing exhaust performance degradation resulting from a delay in the transient response of air-fuel ratio sensor 121 makes it possible to diagnose a considerably long delay in a response as an abnormal state that may lead to exhaust performance degradation. Consequently, reliability in determining a response delay can be improved.

Incidentally, FIG. 7 shows the case where the air-fuel ratio feedback correction coefficient α is limited such that the upper limit value MAX is gradually decreased according to a change in the output of oxygen sensor 122 in the rich direction.

On the other hand, to resume the air-fuel ratio feedback control from a state where a rich air-fuel ratio is held by the open control, the lower limit value MIN is increased when oxygen sensor 122 detects a change in the output of oxygen sensor 122 in the lean direction. This prevents the air-fuel ratio feedback correction coefficient α from being excessively decreased due to a delay in the transient response of air-fuel ratio sensor 121.

Instead of changing both the upper limit value MAX and lower limit value MIN according to the output of oxygen sensor 122, only the upper limit value MAX may be changed according to the output of oxygen sensor 122.

In addition, the upper limit value MAX and/or lower limit value MIN may be changed according to the output of oxygen sensor 122 only during a predetermined period immediately after the resumption of the feedback control from the open control. Further, only the upper limit value MAX may be changed when the air-fuel ratio is lean under the open control. Similarly, only the lower limit MIN may be changed when the air-fuel ratio is rich under the open control.

Figure 8:
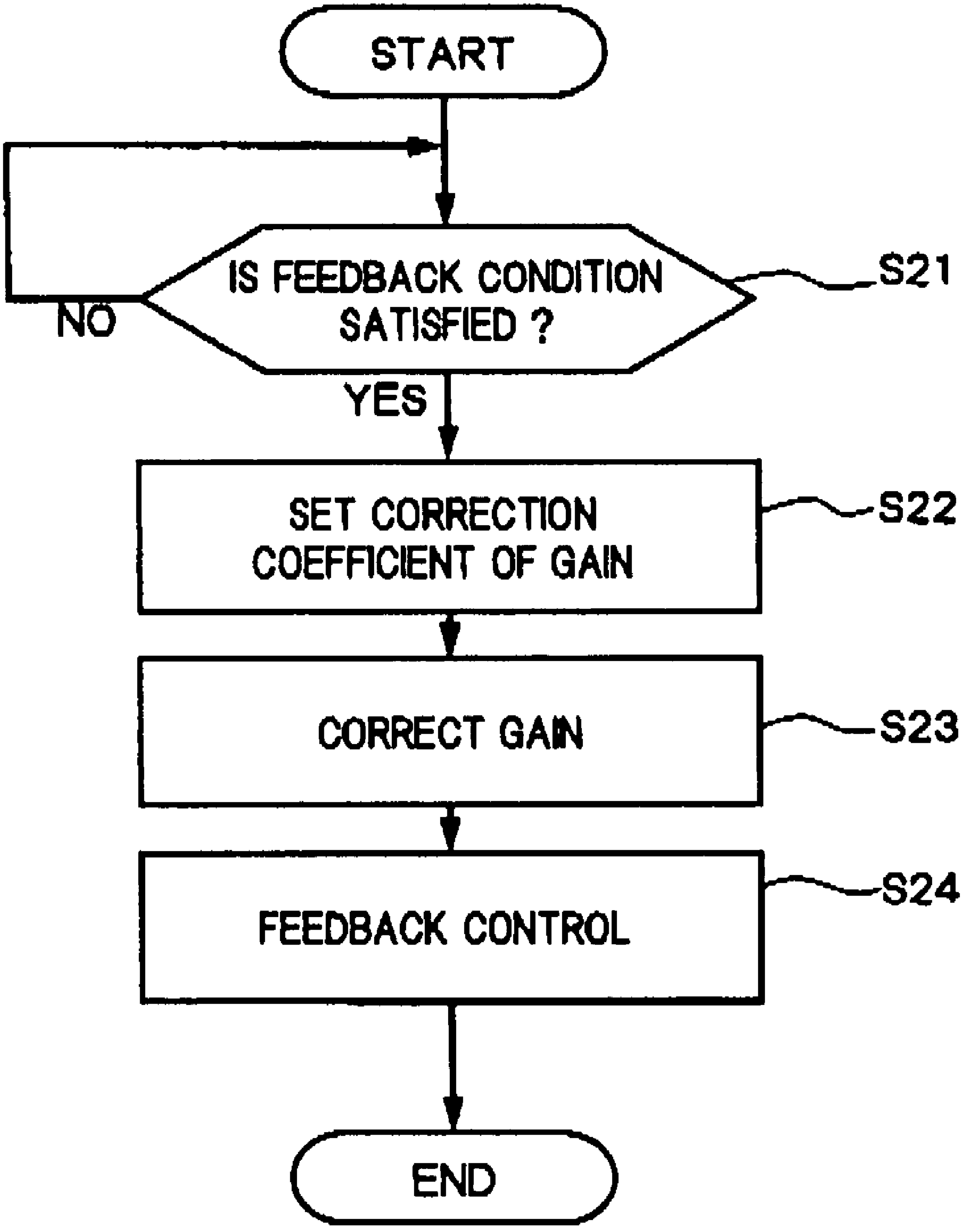
FIG. 8 is a flowchart showing a second embodiment of the air-fuel ratio control according to the present invention.

The flowchart shown in FIG. 8 shows a second embodiment of the air-fuel ratio control employed against a delay in a transient response of air-fuel ratio sensor 121.

In the flowchart in FIG. 8, control unit 114 determines in step S21 whether or not air-fuel-ratio feedback control conditions have been satisfied.

If the determination is affirmative, the flow proceeds to step S22, in which a control gain correction coefficient HOSG in the air-fuel ratio feedback control is determined based on the transient response of air-fuel ratio sensor 121 and the temperature of the cooling water of engine 101 measured at the time.

The transient response of air-fuel ratio sensor 121 is detected, for example, by measuring the time required for responding to a stepwise change in the target air-fuel ratio. The transient response can also be estimated from the length of time for which air-fuel ratio sensor 121 is used or the running distance of a vehicle. It is assumed that the longer the running distance or the length of time for which air-fuel ratio sensor 121 is used, the greater the possibility of a delay in the transient response.

The cooling water temperature of engine 101 is detected as data about the element temperature of air-fuel ratio sensor 121.

The lower the temperature of the element of air-fuel ratio sensor 121, the slower the response of air-fuel ratio sensor 121. Accordingly, a change in the transient response of air-fuel ratio sensor 121 is estimated from the cooling water temperature.

In this case, the correction coefficient HOSG is set such that the longer a delay in the transient response of air-fuel ratio sensor 121 and the lower the cooling water temperature, the lower is the proportional gain and/or integral gain used in the air-fuel ratio feedback control.

In step S23, using the correction coefficient HOSG, the proportional gain and/or integral gain used in the air-fuel ratio feedback control is corrected.

Subsequently, in step S24, the air-fuel ratio feedback correction coefficient α based on the output of air-fuel ratio sensor 121 is computed using the corrected gain.

Figure 9:
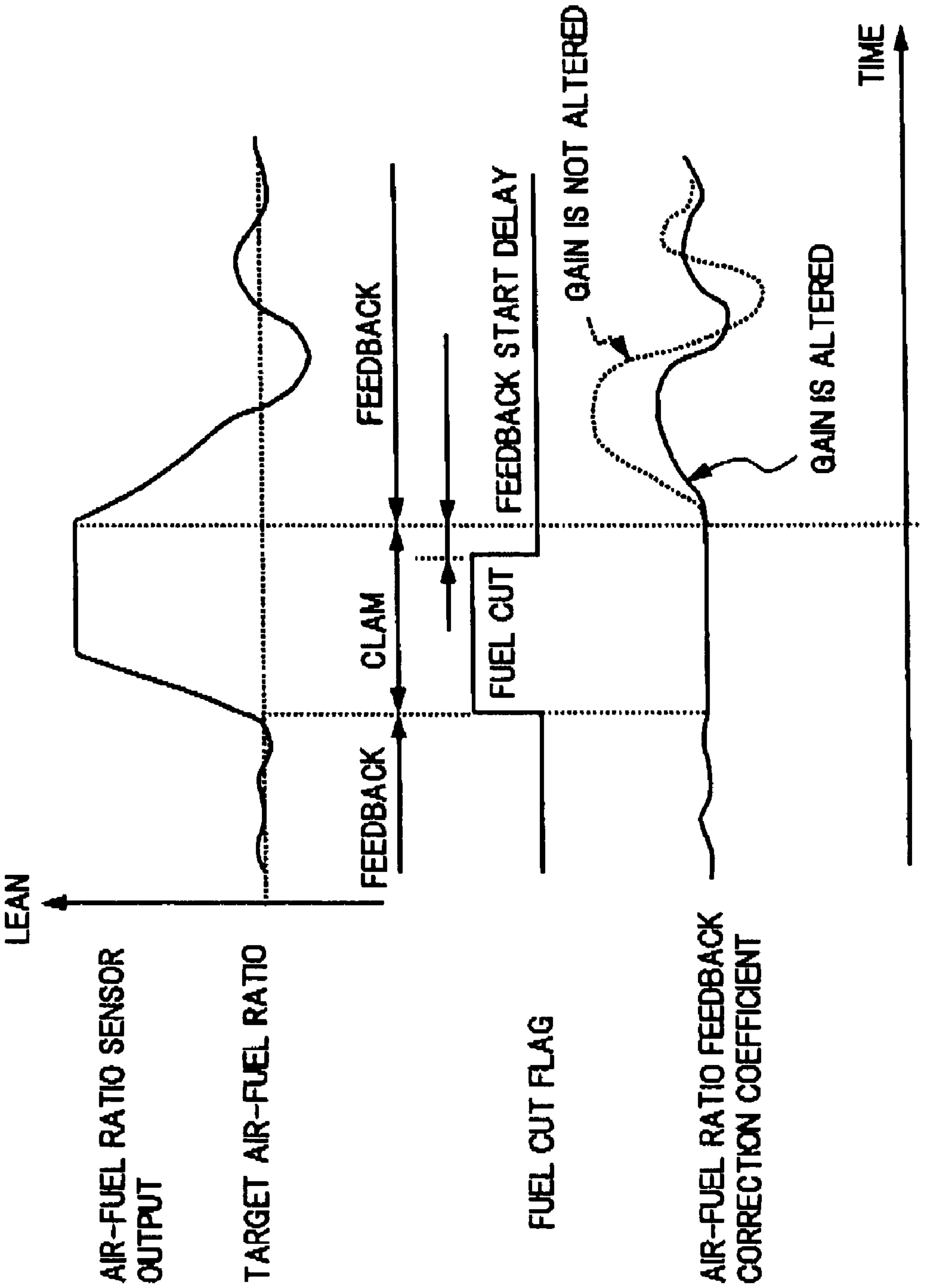
FIG. 9 is a time chart showing the control characteristics of the air-fuel ratio in the second embodiment.

If a delay in the transient response of air-fuel ratio sensor 121 occurs due to deterioration of sensor 121, the control gain is decreased. Hence, even if air-fuel ratio sensor 121 continuously detects a lean state after fuel injection is resumed after a fuel cut, an increase in the air-fuel ratio feedback correction coefficient α due to the detection of the lean state is restricted. This prevents an excessive increase in the amount of fuel injection (refer to FIG. 9).

That is to say, as in the first embodiment, the second embodiment also avoids excessive fuel injection caused by a delay in the transient response of air-fuel ratio sensor 121, thus preventing degraded exhaust performance and drivability.

Additionally, preventing exhaust performance degradation resulting from a delay in the transient response of air-fuel ratio sensor 121 makes it possible to diagnose a significantly long delay as an abnormal state that may lead to degraded exhaust performance. Accordingly, reliability in determining a response delay is improved.

Incidentally, the correction coefficient HOSG can be set only from the transient response of air-fuel ratio sensor 121.

Figure 10:
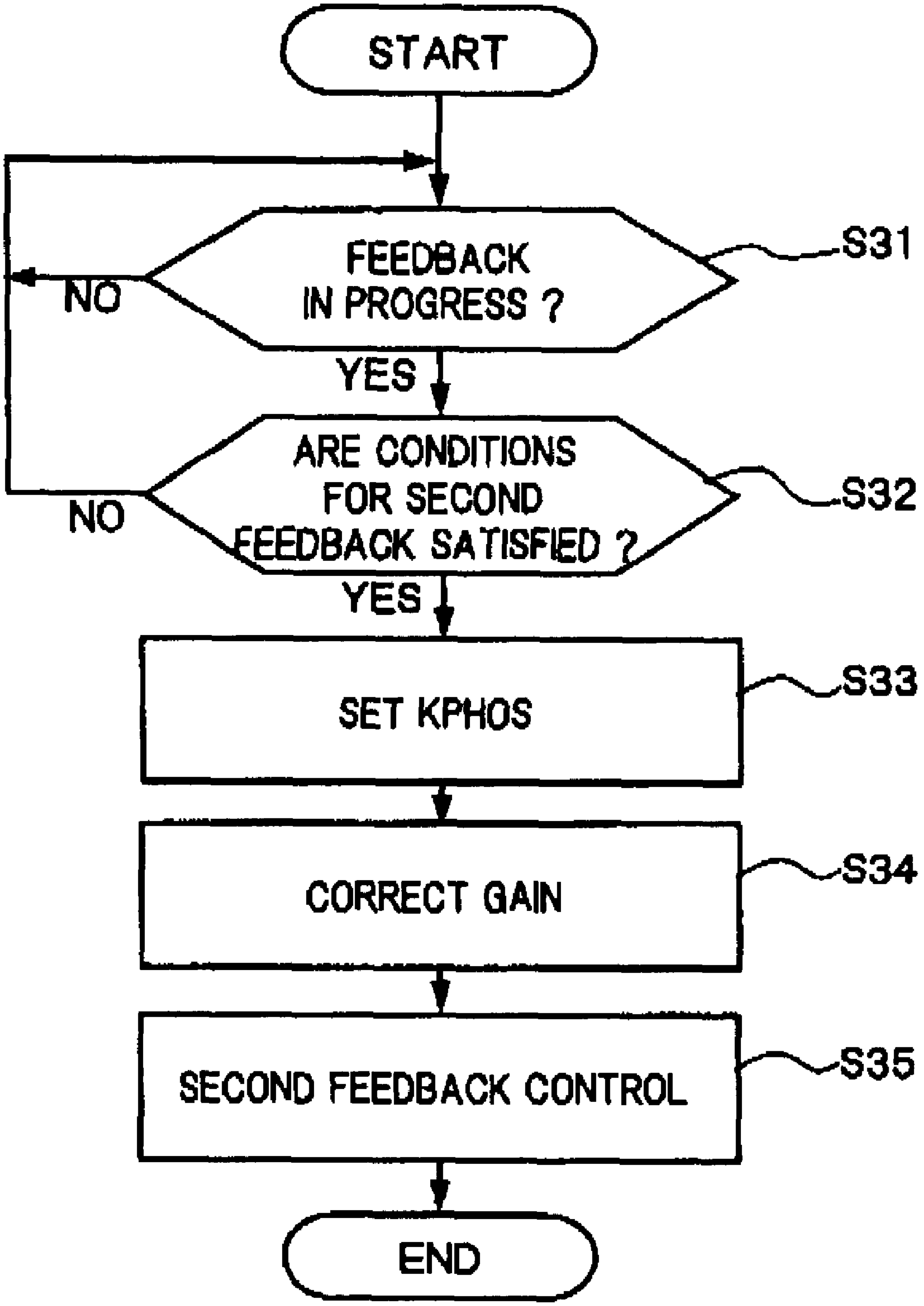
FIG. 10 is a flowchart showing a third embodiment of the air-fuel ratio control according to the present invention.

The flowchart in FIG. 10 shows a third embodiment employed for appropriately dealing with any delay in a transient response of above-described air-fuel ratio sensor 121.

In the flowchart in FIG. 10, control unit 114 determines in step S31 whether or not air-fuel ratio feedback control is being executed.

If the determination is affirmative, the flow proceeds to step S32, in which it is determined whether oxygen sensor 122 has satisfied conditions for executing second air-fuel ratio feedback control.

The conditions for executing the second air-fuel ratio feedback control include the active state of oxygen sensor 122.

If a determination is made in step S32 that the conditions for executing second air-fuel ratio feedback control are satisfied, the flow proceeds to step S33.

In step S33, a correction coefficient KPHOS for the second air-fuel ratio feedback control is set based on the transient response of air-fuel ratio sensor 121.

The transient response of air-fuel ratio sensor 121 can be detected by measuring a response time corresponding to a stepwise change in the target air-fuel ratio. It can also be estimated from the time length for which air-fuel ratio sensor 121 is used or from the running distance of the vehicle. It is assumed that the longer the running distance or the length of time for which air-fuel ratio sensor 121 is used, the longer the delay in the transient response.

To counteract such a situation, a control gain used in the second air-fuel ratio feedback control is increased by making the correction coefficient KPHOS larger as the delay in the transient response of air-fuel ratio sensor 121 becomes longer.

In step S34, the control gain used in the second air-fuel ratio feedback control is corrected based on the correction coefficient KPHOS.

Specifically, an integral gain and/or target air-fuel ratio based on the output of oxygen sensor 122 are corrected using the correction coefficient KPHOS.

Subsequently, in step S35, the first air-fuel ratio feedback control is executed based on the integral gain and/or target air fuel ratio changed using the correction coefficient KPHOS.

The second air-fuel ratio feedback control is exerted such that the integral gain used in the first air-fuel ratio feedback control is changed based on a result obtained by oxygen sensor 122.

In this case, when oxygen sensor 122 determines that the air-fuel ratio is rich, an integral gain used to decrease the air-fuel ratio feedback correction coefficient α is increased, and/or an integral gain used to increase the air-fuel ratio feedback correction coefficient α is decreased. Thus, the air-fuel ratio controlled by the air-fuel ratio feedback correction coefficient α is shifted in the lean direction.

On the other hand, when oxygen sensor 122 determines that the air-fuel ratio is lean, an integral gain used to increase the air-fuel ratio feedback correction coefficient α is increased, and/or an integral gain used to decrease the air-fuel ratio feedback correction coefficient α is decreased. Therefore, the air-fuel ratio controlled by the air-fuel ratio feedback correction coefficient α is shifted in the rich direction.

In addition, the second air-fuel ratio feedback control may be executed such that the target air-fuel ratio in the first air-fuel ratio feedback control can be changed in accordance with the output of oxygen sensor 122.

In this case, when oxygen sensor 122 determines that the air-fuel ratio is rich, the target air-fuel ratio is corrected in the lean direction so that the air-fuel ratio controlled by the air-fuel ratio feedback correction coefficient α is shifted in the lean direction. Conversely, when oxygen sensor 122 determines that the air-fuel ratio is lean, the target air-fuel ratio is corrected in the rich direction so that the air-fuel ratio controlled by the air-fuel ratio feedback correction coefficient α is shifted in the lean direction.

Figure 11:
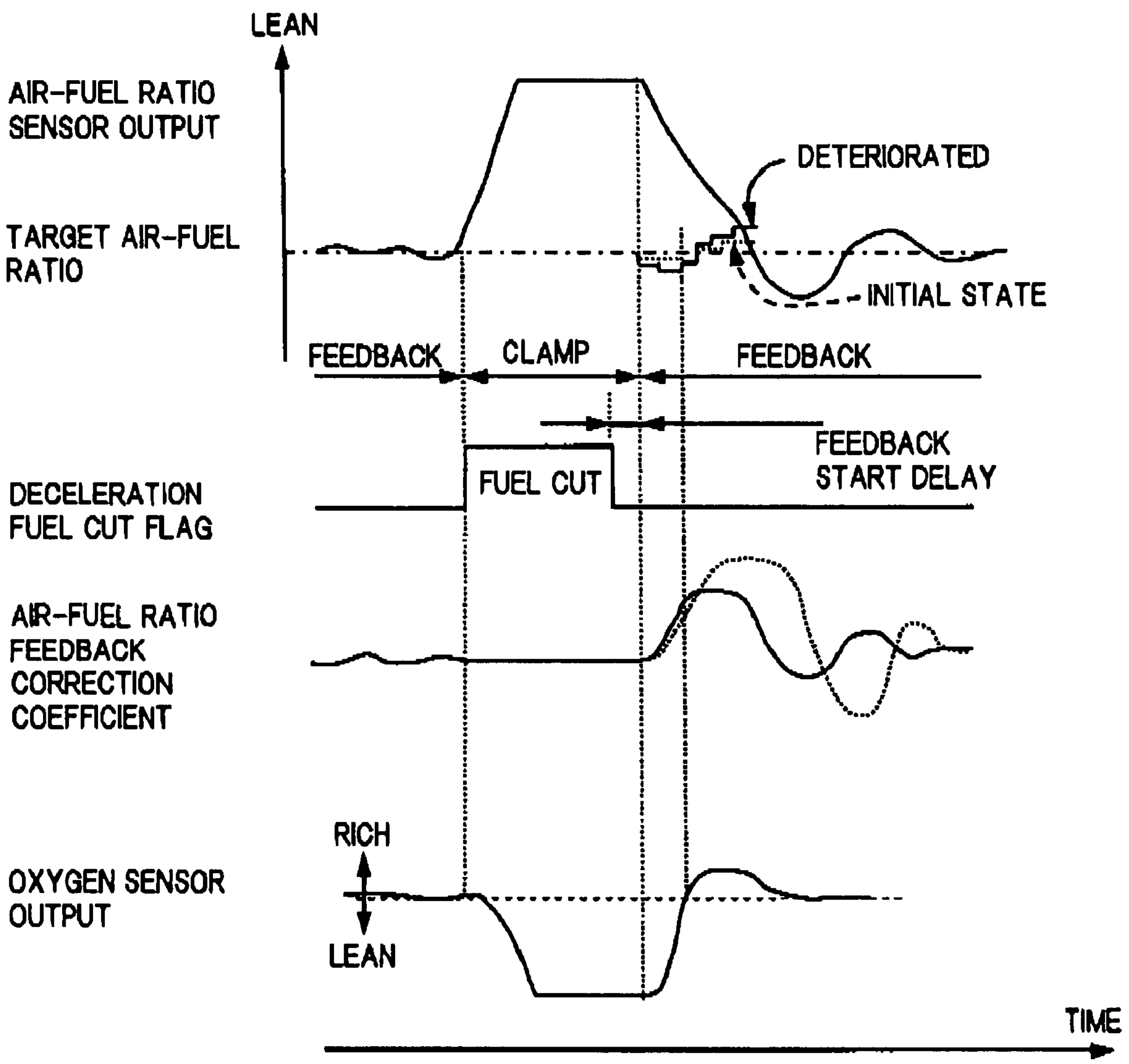
FIG. 11 is a time chart showing the control characteristics of the air-fuel ratio in the third embodiment.

The correction coefficient KPHOS makes a change in the integral gain and/or target air-fuel ratio, based on the result of detection by oxygen sensor 122, larger as a delay in the transient response of air-fuel ratio sensor 121 becomes longer (refer to FIG. 11).

The transient response of air-fuel ratio sensor 121 may deteriorate to such a degree that the sensor output hesitates to fluently change in a direction toward a richer air-fuel ratio within an expected time after a fuel injection resumes after a fuel cut. In such a case, the second air-fuel ratio feedback control shifts the center of the first air-fuel ratio feedback control in the lean direction when oxygen sensor 122 detects a rich air-fuel ratio. Furthermore, in this case, the correction coefficient KPHOS is set so that the first air-fuel ratio feedback control is greatly shifted so as to be centered in the lean direction as degradation in the detection response of air-fuel ratio sensor 121 increases.

This prevents the air-fuel ratio feedback correction coefficient α from being excessively increased due to a significant delay in a change in the output of air-fuel ratio sensor 121.

As in the first and second embodiments, the third embodiment also avoids excessive fuel injection caused by a delay in the transient response of air-fuel ratio sensor 121, thus preventing degraded exhaust performance and drivability.

Additionally, preventing exhaust performance degradation resulting from a delay in the transient response of air-fuel ratio sensor 121 makes it possible to diagnose a significantly long delay in response as an abnormal state that may lead to degraded exhaust performance. Consequently, reliability in preventing a response delay is improved.

Additionally, instead of gradually changing the correction coefficient KPHOS according to the degree of degradation in the transient response of the air-fuel ratio sensor 121, the correction coefficient KPHOS may be changed in two steps after a determination has been made whether the transient response of air-fuel ratio sensor 121 is in the initial state or in a degraded state.

Figure 12:
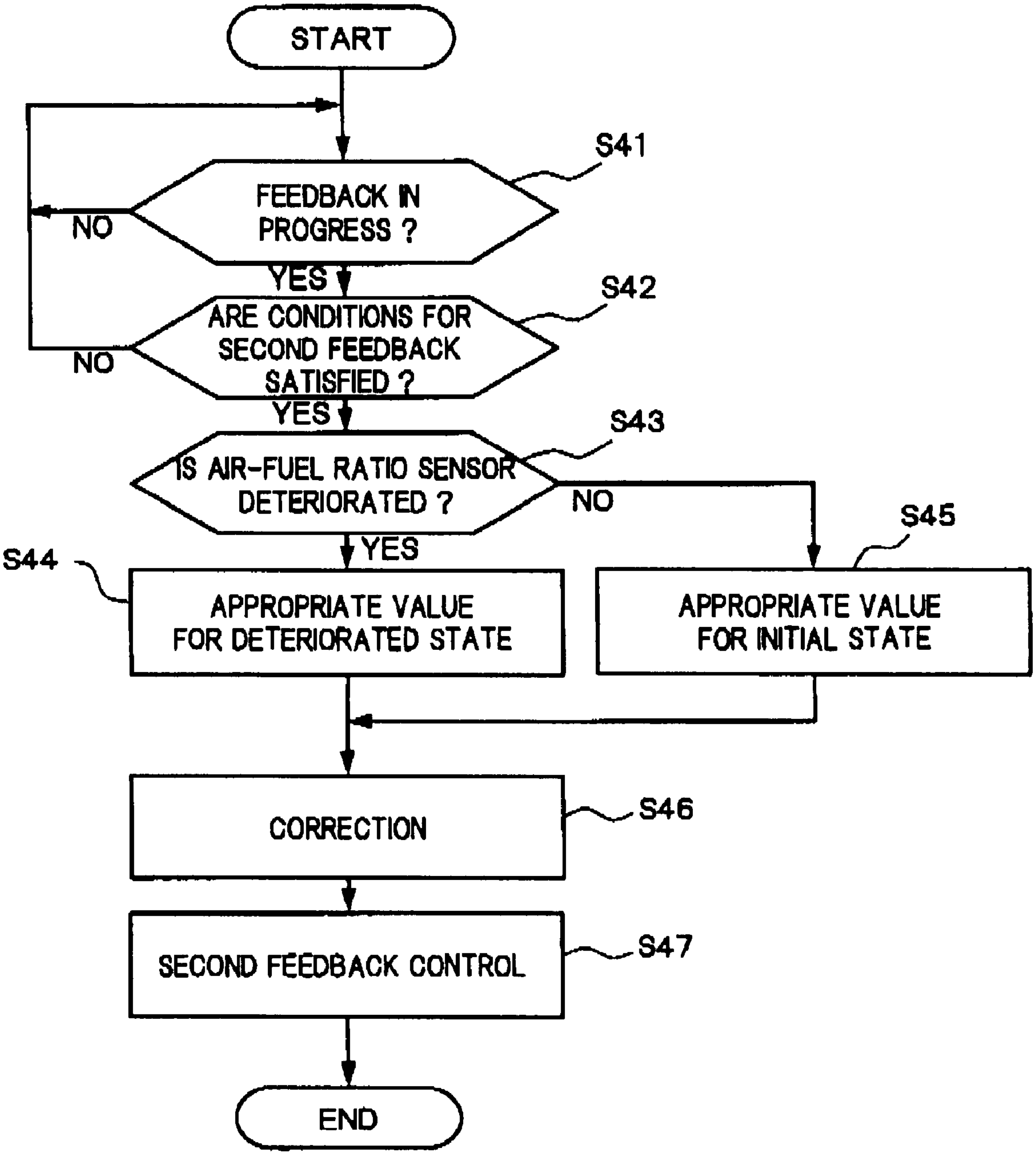
FIG. 12 is a flowchart showing a fourth embodiment of the air-fuel ratio control according to the present invention.

The flowchart in FIG. 12 shows a fourth embodiment provided to change the correction coefficient KPHOS in two steps in the manner mentioned above.

Specifically, in the flowchart in FIG. 12, control unit 114 determines in step S41 whether the air-fuel feedback control is being executed or not.

If the determination is affirmative, the flow proceeds to step S42, in which it is determined whether oxygen sensor 122 has satisfied conditions for executing the second air-fuel ratio feedback control or not.

If the determination is affirmative in step S42, the flow proceeds to step S43.

In step S43, it is determined whether a transient response of air-fuel ratio sensor 121 is in an initial state or a degraded state.

If the determination is made that the transient response of air-fuel ratio sensor 121 is in the initial state, the flow proceeds to step S45, in which the correction coefficient KPHOS is adjusted to a pre-stored value appropriate for the initial state.

On the other hand, if the determination is made that the transient response of air-fuel ratio sensor 121 is in the degraded state, the flow proceeds to step S44, in which the correction coefficient KPHOS is adjusted to a pre-stored value appropriate for the degraded state.

In step S46, the second air-fuel ratio feedback control is corrected based on the correction coefficient KPHOS.

Subsequently, in step S47, the first air-fuel ratio feedback control is executed based on the integral gain and/or target air-fuel ratio altered using the correction coefficient KPHOS.

In this case, the correction coefficient KPHOS for the deteriorated state makes the degree of alteration of the integral gain and/or target air-fuel ratio, which corresponds to the result of detection by oxygen sensor 122, higher than the correction coefficient KPHOS for the initial state.

For example, in the case where the second air-fuel ratio feedback control is executed such that the target air-fuel ratio used in the first air-fuel ratio feedback control is altered according to the output of oxygen sensor 122, the correction coefficient KPHOS for the deteriorated state is corrected to increase the target air-fuel ratio.

When fuel injection is resumed after a fuel cut, air-fuel ratio sensor 121 may continue to detect a lean state even after oxygen sensor 122 has detected a rich air-fuel ratio. In this case, the control point for the air-fuel ratio, which is based on the output of air-fuel ratio sensor 121, is adjusted in the lean direction. This prevents the air-fuel ratio from being excessively increased in the rich direction.

Accordingly, as in the first to third embodiments, the fourth embodiment also avoids excessive fuel injection caused by degradation in the transient response of air-fuel ratio sensor 121, thus preventing degraded exhaust performance and drivability. Additionally, preventing degraded exhaust performance resulting from a delay in the transient response of air-fuel ratio sensor 121 makes it possible to diagnose a significantly long delay in response as an abnormal state that may lead to degraded exhaust performance. Consequently, reliability in preventing a response delay is improved.

The entire contents of Japanese Patent Application No. 2006-078020, filed Mar. 22, 2006 are incorporated herein by reference.

While only selected embodiments have been chosen to illustrate the present invention, it will be apparent to those skilled in the art from this disclosure that various changes and modifications can be made herein without departing from the scope of the invention as defined in the appended claims.

Furthermore, the foregoing description of the embodiments according to the present invention are provided for illustration only, and not for the purpose of limiting the invention as defined by the appended claims and their equivalents.

What we claim is:

1. An air-fuel ratio control apparatus for an engine, comprising:

a first exhaust gas sensor disposed on an upstream side of a catalytic converter interposed between exhaust pipes attached to the engine for exhausting an exhaust gas and configured to deliver an output signal in response to a concentration of a specific component in the exhaust gas;

a control section configured to receive an input signal from at least the first exhaust gas sensor and to compute a control signal for an air-fuel ratio, the control section being further configured to deliver the control signal after computation; and a correcting section configures to correct output characteristics of the control signal computed by the control section, according to a transient response of the first exhaust gas sensor.

2. The air-fuel ratio control apparatus according to claim 1, wherein the correcting section corrects the output characteristics of the control signal computed by the control section, in respect of a delay in the transient response of the first exhaust gas sensor.

3. The air-fuel ratio control apparatus according to claim 1, further comprising a second exhaust gas sensor disposed on a downstream side of the catalytic converter and configured to deliver an output signal in response to the concentration of the specific component in the exhaust gas, wherein the correcting section comprises a computing section configured to compute limit values of the control signal based on the output signal from the second exhaust gas sensor, the control section comprising a limiting section configured to receive, as inputs, the limit values and the control signal and to deliver as an output thereof, the control signal that is limited by the limit values.

4. The air-fuel ratio control apparatus according to claim 3, wherein the computing section changes a rich limit value of the control signal from an initial value when the air-fuel ratio determined based on the output signal from the second exhaust gas sensor is richer than a target value, and changes a lean limit value of the control signal from an initial value when the air-fuel ratio determined based on the output signal from the second exhaust gas sensor is leaner than a target value.

5. The air-fuel ratio control apparatus according to claim 3, wherein the control signal is a correction coefficient to correct an amount of fuel injection into the engine, and the computing section changes an upper limit value of the control signal to a value smaller than an initial value when the air-fuel ratio determined based on the output signal from the second exhaust gas sensor is richer than a target value, and changes a lower limit value of the control signal to a value larger than the initial value when the air-fuel ratio determined based on the output signal from the second exhaust gas sensor is leaner than a target value.

6. The air-fuel ratio control apparatus according to claim 1, wherein the correcting section comprises:

a response detecting section configured to detect the transient response of the first exhaust gas sensor; and a gain correcting section configured to correct a gain of the control section, based on the transient response of the first exhaust gas sensor.

7. The air-fuel ratio control apparatus according to claim 6, wherein the gain correcting section decreases the gain of the control section when a response speed of the transient response of the first exhaust gas sensor decreases.

8. The air-fuel ratio control apparatus according to claim 6, wherein the correcting section further comprises a temperature detecting section configured to detect a temperature of an element of the first exhaust gas sensor, and the gain correcting section corrects the gain of the control section, based on the transient response of the first exhaust gas sensor and the temperature of the element of the first exhaust gas sensor.

9. The air-fuel ratio control apparatus according to claim 1, further comprising: a second exhaust gas sensor disposed on a downstream side of the catalytic converter, and configured to deliver an output signal in response to a concentration of a specific component in the exhaust gas; and a response detecting section configured to detect the transient response of the first exhaust gas sensor, wherein the control section is configured to receive input signals from the first and second exhaust gas sensors to thereby compute the control signal for the air-fuel ratio, the control section being configured to deliver, as an output, the control signal after computation, and wherein the correcting section is configured to correct a control gain in the control section that is based on the output signal from the second exhaust gas sensor, on the basis of the transient response of the first exhaust gas sensor.

10. The air-fuel ratio control apparatus according to claim 9, wherein the correcting section is configured to increase the control gain that is based on the output signal from the second exhaust gas sensor in respect to a decrease in a speed of the transient response of the first exhaust gas sensor.

11. The air-fuel ratio control apparatus according to claim 9, wherein the control section is configured to compute the control signal based on a difference between a target air-fuel ratio and the air-fuel ratio determined based on the output signal from the first exhaust gas sensor, and to change the target air-fuel ratio according to the air-fuel ratio determined based on the output signal from the second exhaust gas sensor, and wherein the correcting section is configured to correct a degree of change in the target air-fuel ratio based on the transient response of the first exhaust gas sensor.

12. The air-fuel ratio control apparatus according to claim 9, wherein the control section is configured to compute the control signal based on a difference between a target air-fuel ratio and the air-fuel ratio determined based on the signal from the first exhaust gas sensor, and to change a gain of the control signal in respect to the output signal from the first exhaust gas sensor, according to directions in which the control signal is changed, based on the air-fuel ratio detected based on the output signal from the second exhaust gas sensor, and wherein the correcting section corrects a degree of change in the gain based on the transient response of the first exhaust gas sensor.

13. An air-fuel ratio control apparatus of an engine, comprising:

first concentration detecting means for delivering an output signal in response to a concentration of a specific component in an exhaust gas, the first concentration detecting means being disposed on an upstream side of a catalytic converter interposed between exhaust pipes attached to the engine for exhausting the exhaust gas;

control means for receiving an input signal from at least the first concentration detecting means, and for computing and delivering an output control signal for an air-fuel ratio; and correcting means for correcting, according to a transient response of the first concentration detecting means, an output characteristic of the control signal in the control means.

14. An air-fuel ratio control method of an engine including a first exhaust gas sensor disposed on an upstream side of a catalytic converter interposed between exhaust pipes attached to the engine to deliver an output signal in response to a concentration of a specific exhaust component, the method comprising the steps of:

setting output characteristics of a control signal for an air-fuel ratio according to a transient response of the first exhaust gas sensor; and computing the control signal from the output signal delivered by the first exhaust gas sensor, based on the set output characteristics, to thereby deliver an output indicating the control signal after computation.

15. The air-fuel ratio control method according to claim 14, wherein the step of setting the output characteristics comprises the step of:

correcting the output characteristics of the control signal after computation, in respect to a delay in the transient response of the first exhaust gas sensor.

16. The air-fuel ratio control method according to claim 14, wherein the engine further comprises a second exhaust gas sensor which is disposed on a downstream side of the catalytic converter to deliver an output signal in response to the concentration of the specific component in the exhaust gas, and wherein the step of setting the output characteristics comprises the step of:

computing limit values of the control signal after computation, based on the output signal from the second exhaust gas sensor, and the step of delivering the control signal after computation comprises the step of limiting the control signal after computation by the limit values.

17. The air-fuel ratio control method of an engine according to claim 16, wherein the step of computing the limit values comprises the steps of:

changing a rich limit value of the output control signal after computation from an initial value when the air-fuel ratio detected based on the output signal from the second exhaust gas sensor is richer than a target value; and changing a lean limit value of the output control signal after computation from an initial value when the air-fuel ratio determined based on the output signal from the second exhaust gas sensor is leaner than the target value.

18. The air-fuel ratio control method according to claim 16, wherein the step of delivering the output control signal after computation comprises the step of:

delivering, as the control signal after computation, a correction coefficient used to connect an amount of fuel injection, and the step of computing the limit values comprises the step of:

changing the upper limit value of the output control signal after computation to be smaller than the initial value when the air-fuel ratio determined based on the output signal from the second exhaust gas sensor is richer then the target value; and changing the lower limit value of the control signal after computation to be larger than the initial value when the air-fuel ratio determined based on the output signal from the second exhaust gas sensor is leaner than the target value.

19. The air-fuel ratio control method according to claim 14, wherein the step of setting the output characteristics comprises the steps of:

detecting the transient response of the first exhaust gas sensor; and correcting, based on the transient response of the first exhaust gas sensor, a gain of the control signal in respect to the output signal from the first exhaust gas sensor.

20. The air-fuel ratio control method according to claim 19, wherein the step of correcting the gain comprises the step of:

decreasing the gain when a response speed of the transient response of the first exhaust gas sensor decreases.

21. The air-fuel ratio control method according to claim 14, wherein the step of setting the output characteristic comprises the steps of:

detecting the transient response of the first exhaust gas sensor;

detecting a temperature of an element of the first exhaust gas sensor; and correcting a gain of the control signal after computation in respect to the output signal from the first exhaust gas sensor, based on the transient response of the first exhaust gas sensor and the temperature of the element of the first exhaust gas sensor.

22. The air-fuel ratio control method according to claim 14, wherein the engine further includes a second exhaust gas sensor which is disposed on a downstream side of the catalytic converter to deliver an output signal corresponding to the concentration of the specific component in the exhaust gas, and wherein the step of setting the output characteristics comprises the steps of:

setting, based on the transient response of the first exhaust gas sensor, a control gain based on the output signal from the second exhaust gas sensor, and the step of delivering the control signal after computation comprises the step of correcting, according to the control gain and based on the output signal from the second exhaust gas sensor, a computation for computing the control signal on the basis of the output signal from the first exhaust gas sensor.

23. The air-fuel ratio control method according to claim 22, wherein the step of setting the control gain comprises increasing the control gain based on the output signal from the second exhaust gas sensor in respect to a decrease in a response speed of the transient response of the first exhaust gas sensor.

24. The air-fuel ratio control method according to claim 22, wherein the step of delivering the control signal after computation comprises the steps of.

computing the control signal based on a difference between a target air-fuel ratio and the air-fuel ratio detected based on the output signal from the first exhaust gas sensor; and changing a target air-fuel ratio according to the air-fuel ratio detected based on the output signal from the second exhaust gas sensor, and wherein the step of setting the control gain comprises the step of:

correcting, based on the transient response of the first exhaust gas sensor, a degree of change in the target air-fuel ratio.

25. The air-fuel ratio control method according to claim 22, wherein the step of delivering the control signal after computation comprises the steps of:

computing the control signal based on a difference between a target air-fuel ratio and the air-fuel ratio detected based on the output signal from the first exhaust gas sensor; and changing a gain of the control signal after computation in respect to the output signal from the first exhaust gas sensor, according to a difference in directions in which the control signal is changed and based on the air-fuel ratio determined based on the output signal from the second exhaust gas sensor, and wherein the step of setting the control gain comprises the step of:

correcting a degree of change in the gain based on the transient response of the first exhaust gas sensor.

* * * * *